United States Patent
Kusumoto et al.

(10) Patent No.: US 10,408,617 B2
(45) Date of Patent: Sep. 10, 2019

(54) WATER LEVEL MEASUREMENT SYSTEM AND WATER LEVEL CONTROL SYSTEM, AND WATER LEVEL MEASUREMENT METHOD AND WATER LEVEL CONTROL METHOD USING SUCH SYSTEMS

(71) Applicant: PRODRONE CO., LTD., Nagoya-shi, Aichi (JP)

(72) Inventors: Shintaro Kusumoto, Nagoya (JP); Kiyokazu Sugaki, Nagoya (JP); Kazuo Ichihara, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/775,043

(22) PCT Filed: Dec. 12, 2016

(86) PCT No.: PCT/JP2016/086845
§ 371 (c)(1),
(2) Date: May 10, 2018

(87) PCT Pub. No.: WO2017/110538
PCT Pub. Date: Jun. 29, 2017

(65) Prior Publication Data
US 2018/0356221 A1  Dec. 13, 2018

(30) Foreign Application Priority Data

Dec. 22, 2015 (JP) .................................. 2015-249240

(51) Int. Cl.
*G01C 13/00* (2006.01)
*G01F 23/04* (2006.01)
(Continued)

(52) U.S. Cl.
CPC .......... *G01C 13/008* (2013.01); *B64C 39/024* (2013.01); *G01F 23/04* (2013.01);
(Continued)

(58) Field of Classification Search
CPC .................................................... G01C 13/002
See application file for complete search history.

(56) References Cited

U.S. PATENT DOCUMENTS 6,098,029 A    8/2000  Takagi et al.
6,761,066 B2 *  7/2004  Rait ........................ G01F 23/22
                                                        73/290 R
(Continued)

FOREIGN PATENT DOCUMENTS

JP    H05-180669 A    7/1993
JP    H08-145765 A    6/1996
(Continued)

OTHER PUBLICATIONS

Klemas, Victor V. Coastal and Environmental Remote Sensing from Unmanned Aerial Vehicles: An Overview. Journal of Coastal Research: vol. 31, Issue 5: 1260-1267. 2015 https://doi.org/10.2112/JCOASTRES-D-15-00005.1 (Year: 2015).*

(Continued)

*Primary Examiner* — Paul M. West
*Assistant Examiner* — Mark A Shabman
(74) *Attorney, Agent, or Firm* — Oliff PLC

(57) ABSTRACT

A water level measurement system including: a water level gauge including a scale part which is installed to extend upward at a predetermined angle of inclination from a water surface; and an unmanned aerial vehicle including image capturing means for capturing the scale part from above and a plurality of rotary wings, and is also solved by a water level control system including the water level measurement system and water level adjustment equipment capable of (Continued)

adjusting an amount of water in a water area in which the water level gauge is installed, wherein the unmanned aerial vehicle includes the water level determining unit and water level control means for remotely operating the water level adjustment equipment through wireless communication, as well as a water level measurement method and a water level control method using the above systems.

11 Claims, 7 Drawing Sheets

(51) Int. Cl.
| | |
|---|---|
| *G01F 23/292* | (2006.01) |
| *B64C 39/02* | (2006.01) |
| *G06T 7/60* | (2017.01) |
| *G05D 9/12* | (2006.01) |
| *G06T 7/73* | (2017.01) |
| *G06T 7/90* | (2017.01) |
| *G05D 1/10* | (2006.01) |

(52) U.S. Cl.
CPC ............ *G01F 23/292* (2013.01); *G05D 9/12* (2013.01); *G06T 7/60* (2013.01); *G06T 7/73* (2017.01); *B64C 2201/123* (2013.01); *G05D 1/102* (2013.01); *G06T 7/90* (2017.01); *G06T 2207/10024* (2013.01); *G06T 2207/10032* (2013.01); *G06T 2207/30181* (2013.01); *Y02A 90/32* (2018.01)

(56) References Cited

U.S. PATENT DOCUMENTS

| | | | |
|---|---|---|---|
| 7,306,120 B2 * | 12/2007 | Hughes | .............. G01F 19/00 222/158 |
| 2010/0322462 A1 * | 12/2010 | Wu | .............. G06K 9/00 382/100 |
| 2015/0162981 A1 | 6/2015 | Hazelden | |

FOREIGN PATENT DOCUMENTS

| | | |
|---|---|---|
| JP | 2001-133311 A | 5/2001 |
| JP | 2008-203123 A | 9/2008 |
| JP | 2010-202178 A | 9/2010 |
| JP | 2014-44067 A | 3/2014 |
| JP | 2014-228400 A | 12/2014 |
| JP | 2016-156778 A | 9/2016 |

OTHER PUBLICATIONS

Mar. 7, 2017 International Search Report issued in International Patent Application No. PCT/JP2016/086845.

Jul. 25, 2017 Office Action issued in Japanese Patent Application No. 2015-249240.

Apr. 18, 2017 Office Action issued in Japanese Patent Application No. 2015-249240.

\* cited by examiner ately high as well and their prices are still on a downtrend. Besides, because UAVs are expected to fly autonomously, a mode of operation that a worker flies a UAV to check a water level every time is inefficient.

The present invention has been made to address the abovementioned problems and an object of the invention is to provide a water level measurement system and a water level control system using an unmanned aerial vehicle as well as a water level measurement method and a water level control method using such systems that make it possible to measure a water level easily, accurately, efficiently, and safely.

WATER LEVEL MEASUREMENT SYSTEM AND WATER LEVEL CONTROL SYSTEM, AND WATER LEVEL MEASUREMENT METHOD AND WATER LEVEL CONTROL METHOD USING SUCH SYSTEMS

TECHNICAL FIELD

The present invention relates to a water level measurement system and a water level control system using an unmanned aerial vehicle equipped with a plurality of rotary wings as well as a water level measurement method and a water level control method using such systems.

BACKGROUND ART

Water level measurement for rivers, irrigation canals, paddy fields, water reservoirs, etc. is, in most cases, performed as follows: install a water level marker (also called a water level post) with a scale in a place where it can be seen from up close and a person visually reads a water surface position indicated by the scale. Alternatively, measurement using a so-called float type, ultrasonic type, or pressure type water level gauge is generally performed. Such a water level gauge is usually installed near the waterfront of a water area which is a measuring object and a worker reads a value indicated by the water level gauge in a site, thus checking the water level.

Now, conventionally, miniature unmanned aerial vehicles (UAVs) which are typified by unmanned helicopters for industrial use have been expensive and hard to obtain and manipulative skills have been needed to make them fly stably. However, for airframe mounted components such as an acceleration sensor and an angular velocity sensor, recently, their performance has been enhanced and their prices have decreased and UAV maneuverability has improved dramatically, because many operations to control and manipulate the UAV airframe have been automated. Against this background, attempts are now made to apply, especially, miniature multicopters to diverse missions in a wide range of fields, not only for hobby purposes.

CITATION LIST

Patent Literature

PTL1: JP H08-145765 A
PTL2: JP 2014-228400 A

SUMMARY OF INVENTION

Technical Problem

In a way in which a worker goes to the site and checks the water level, like the above-descried water level measurement, it takes man-hours to move to the site, and in the event of water rising, the worker might be exposed to danger. In a case where checking the water level is simply for the purpose of monitoring for an abnormal water level, most of the checking work does not lead to a later particular action and it is not very cost-effective.

As an attempt to automate water level monitoring, there is, for example, such a method that a stationary camera which captures images of a water level marker is installed near the water level marker and a water level indicated by the water level marker is read by analyzing the images captured by the camera. However, reading a water level from captured images poses a problem in that it is hard to distinguish between a part of the entire length of the water level marker exposed above the water surface and apart under the water surface that is visible transparently through water or distinguish between the part exposed above water surface and its reflection mirrored on the water surface.

In PTL1 mentioned above, by combination of a water level marker (water level post 3) vertically installed through the water surface and an auxiliary post (sub water level post 8) installed slantwise right beside the water level marker, a method of distinguishing between a part of the water level marker above the water surface and a part under the water surface and between the part of the water level marker above the water surface and its reflection mirrored on the water surface is disclosed. Taking advantage of a natural phenomenon in which the reflection of the water level marker mirrored on the water surface is distorted under an environment where the water surface is rippled by waves or the like, the method of PTL1 captures a plurality of images of the water level marker, compares the images, and recognizes apart changed across the images as the reflection. Also, in an environment where the water surface is still, with reference to an infraction position of the auxiliary post installed slantwise, the method recognizes a part below the refraction position as the part immersed in water.

It is considered possible to develop a scheme that automates water level monitoring by using the method of PTL1 and, for instance, notifies a worker only when an abnormal water level has been detected. However, in a case where the method of PTL1 is used, it is required to prepare as many cameras as the number of water level markers. Also, for a place to install a camera, it is required to select a place where no obstacle exists between the camera and the water level marker and image capturing is not affected by passing of a person, a bird or a beast. Moreover, if a place suitable for installing a camera is on someone's land, it might be difficult to install a camera. Furthermore, periodic maintenance, such as cleaning the installed camera and replacing consumables, is also needed and a worker has to go the site when the maintenance is performed.

To address the abovementioned problems associated with image capturing by a stationary camera, it is considered effective to install a camera in an unmanned aerial vehicle equipped with a plurality of rotary wings and capture images of a water level marker through the unmanned aerial vehicle. However, from vertically above, it is impossible to catch sight of existing water level markers installed on or beside a bridge pier, a harbor wall surface, or the like. Also, when capturing an image of such a water level marker from above at an angle, it is necessary to adjust the direction and angle of image capturing with respect to each object; this complicates the work. Also, in this case, since it is necessary to cause the unmanned aerial vehicle to fly at a relatively low altitude, such flying entails an increased risk of collision with a structure on land or a passer-by.

In PTL2 mentioned above, a method is disclosed that uses an aircraft, a satellite, or the like equipped with a radar observation device; this method calculates the height of the water surface of a river and the height of a bridge based on observation values acquired by the radar, thus measuring the water level of a river. This method measures a water level from above, uses observation values by the radar instead of visible images, and is based on electromagnetic waves reflected and scattered by the water surface; therefore, its technical idea essentially differs from capturing images of a water level marker with a camera installed in an unmanned aerial vehicle as described above.

Now, in either of the abovementioned PTLs, nothing is described about a technical aspect of linking a result of water level measurement with water level adjustment.

In consideration of the problems mentioned above, a problem to be solved by the present invention resides in providing a water level measurement system capable of measuring a water level remotely by using an unmanned aerial vehicle without requiring a worker to go to the site and a water level control system capable of making water level adjustment remotely in response to a result of the water level measurement.

Solution to Problem

To solve the foregoing problem, a water level measurement system of the present invention includes a water level gauge including a scale part which is installed to extend upward at a predetermined angle of inclination from a water surface; and an unmanned aerial vehicle including image capturing means for capturing the scale part from above and a plurality of rotary wings.

By making the scale part of the water level gauge extend upward at an angle from a water surface, it is possible to catch sight of the scale part even from vertically above. That is, it would become possible to read a water level from a scale part image captured from above through the use of an unmanned aerial vehicle having a plurality of rotary wings. Thereby, it is not necessary for a person to adjust the position and direction of capturing an image of a scale part depending on the environment of the site and there is no need to use sophisticated skills for piloting an unmanned aerial vehicle. It would become possible to realize automation of the work of scale part image capturing easily and highly accurately.

In addition, it is preferable that a surface color of the scale part changes reversibly by wetting with water or depending on surface temperature.

Of the entire length of a scale part, a part extending above a water surface and a part immersed in water are displayed in different colors; this makes it possible to easily determine the water surface position indicated by the scale part even in an environment where, e.g., water transparency is extremely high and the water surface is still. Especially, in the case of automating reading a water level, it would become possible to determine the water surface position without carrying out complicated image analysis as in PTL1 mentioned above.

It is also preferable that the unmanned aerial vehicle further includes a control unit which controls autonomous flying with the plurality of rotary wings, a storage unit having an installation position of the scale part stored, and flying position measuring means for measuring a position where the vehicle is flying.

The unmanned aerial vehicle automatically moves to the scale part installation position and captures images of the scale part; this can dispense with a worker task of piloting the unmanned aerial vehicle. Also, upon finishing the image capturing, the unmanned aerial vehicle is set to return to its departure and arrival site, of course; therefore, maintenance of the airframe of the unmanned aerial vehicle and the image capturing means can be performed without requiring the worker to go to the site.

It is also preferable that the unmanned aerial vehicle autonomously flies to the scale part installation position stored in the storage unit and captures images of the scale part through the image capturing means oriented directly beneath the vehicle while staying in the air vertically above the scale part.

By capturing images of a scale part, which is directly beneath the vehicle, from vertically above the scale part, it can be prevented that a reflection of the scale part is mirrored on a water surface; this makes it easy to determine the water surface position indicated by the scale part. Especially, in the case of automating reading a water level, it would become possible to determine the water surface position without carrying out complicated image analysis as in PTL1 mentioned above.

In addition, a configuration may be such that, on the water level gauge, a one-dimensional or two-dimensional information code representing individual identification information of the water level gauge is displayed in a position that is visible from above and the unmanned aerial vehicle includes decoding means for reading the individual identification information from an image of the information code captured by the image capturing means.

On each water level gauge, an information code is displayed that represents its individual identification information; thereby, it would be possible to exactly identify a water level gauge and its water area even in a case where multiple water level gauges are installed within a relatively small coverage such as, e.g., in terraced paddy fields and small agricultural canals.

It is also preferable that the water level measurement system further includes a water level determining unit which analyzes an image of the scale part captured by the image capturing means of the unmanned aerial vehicle and determines a water level when the image is captured.

In a case where a worker visually reads a water level from a captured image of a scale part, the worker has to look through all captured images, and therefore, the work becomes inefficient. By including the water level determining unit which automatically reads a water level from a scale part image captured, it would become possible that, in case of an abnormal water level or only when a worker's action has become necessary, the worker is notified accordingly.

To solve the foregoing problem, the water level control system of the present invention includes a water level measurement system, in which the unmanned aerial vehicle includes the water level determining unit and water level adjustment equipment capable of adjusting an amount of water in a water area in which the water level gauge is installed, wherein the unmanned aerial vehicle includes water level control means for remotely operating the water level adjustment equipment through wireless communication.

The unmanned aerial vehicle includes the water level determining unit and, by making it possible to remotely operate the water level adjustment equipment from the unmanned aerial vehicle, the unmanned aerial vehicle becomes able to perform water level measurement and water level adjustment successively or at the same time as needed. Thereby, by an unmanned aerial vehicle, it would become possible to not only measure a water level simply, but also control a water level to be corrected to a proper value automatically.

It is also preferable that the water level adjustment equipment includes fail-safe means for automatically placing the equipment in a predefined operation state when a signal from the water level control means is absent for a predetermined period of time or longer after the start of a remote operation by the water level control means and before receiving a signal indicating termination of the operation.

The water level adjustment equipment includes the fail-safe means; when any fault has occurred in the unmanned aerial vehicle while the water level adjustment equipment is operated by unmanned aerial vehicle, it would become possible to prevent damage from spreading in a contingency by automatically carrying out an emergency operation such as, e.g., keeping the water level as it is.

In addition, the water level control system of the present invention may be configured to include a water level measurement system including an unmanned aerial vehicle capable of autonomous flying; water level adjustment equipment capable of adjusting an amount of water in a water area in which the water level gauge is installed; and a command unit communicatively connected with the unmanned aerial vehicle and the water level adjustment equipment, and the unmanned aerial vehicle and the command unit are connected via a mobile communication network, and the command unit includes display means for displaying information received from the unmanned aerial vehicle and water level control means for remotely operating the water level adjustment equipment.

By connecting the command unit with the unmanned aerial vehicle via mobile communication networks which are laid nationwide, the command unit can receive information such as scale part images captured and output values of the water level determining unit from the unmanned aerial vehicle substantially without being subjected to restrictions due to communication distance. Thereby, it is possible to measure a water level of a distant water area and adjust the water level from the command unit without going to the site.

To solve the foregoing problem, a water level measurement method using the water level measurement system of the present invention includes an outward flying step which causes the unmanned aerial vehicle to fly from a departure and arrival site toward the water level gauge installation position; an image capturing step which causes the unmanned aerial vehicle to capture images of the scale part through the image capturing means oriented directly beneath the vehicle while keeping the vehicle in the air vertically above the scale part; and a homeward flying step which causes the unmanned aerial vehicle to come back to the departure and arrival site.

In addition, to solve the foregoing problem, a water level control method using the water level control system of the present invention includes an outward flying step in which the unmanned aerial vehicle autonomously flies from a departure and arrival site toward the scale part installation position stored in the storage unit; an image capturing step in which the unmanned aerial vehicle captures images of the scale part through the image capturing means oriented directly beneath the vehicle while staying in the air vertically above the scale part; a water level adjustment step in which, based on a result of the image capturing step, the water level control means remotely operates the water level adjustment equipment; and a homeward flying step in which the unmanned aerial vehicle autonomously flies and comes back to the departure and arrival site.

Advantageous Effects of Invention

As described above, according to the water level measurement system pertaining to the present invention, it would become possible to measure a water level remotely without requiring a worker to go to the site. Also, according to the water level control system pertaining to the present invention, it would become possible to adjust a water level remotely in response to a result of measurement performed by the above water level measurement system.

DESCRIPTION OF EMBODIMENTS

In the following, embodiments of the present invention will be described in detail with the aid of the drawings. A water level measurement system and a water level control system as well as a water level measurement method and a water level control method pertaining to embodiments described below are examples which perform measurement of the water level of a water reservoir facility W located outdoors and control of its water level. Water areas for which the present invention can be applied are not limited to water reservoirs, and the present invention can be used for rivers, irrigation canals, lakes, paddy fields, harbors, etc. In addition, the present invention can be used for any space in which water (liquid) is stored, regardless of whether indoor or outdoor.

First Embodiment

[Overall Configuration]

Figure 1:
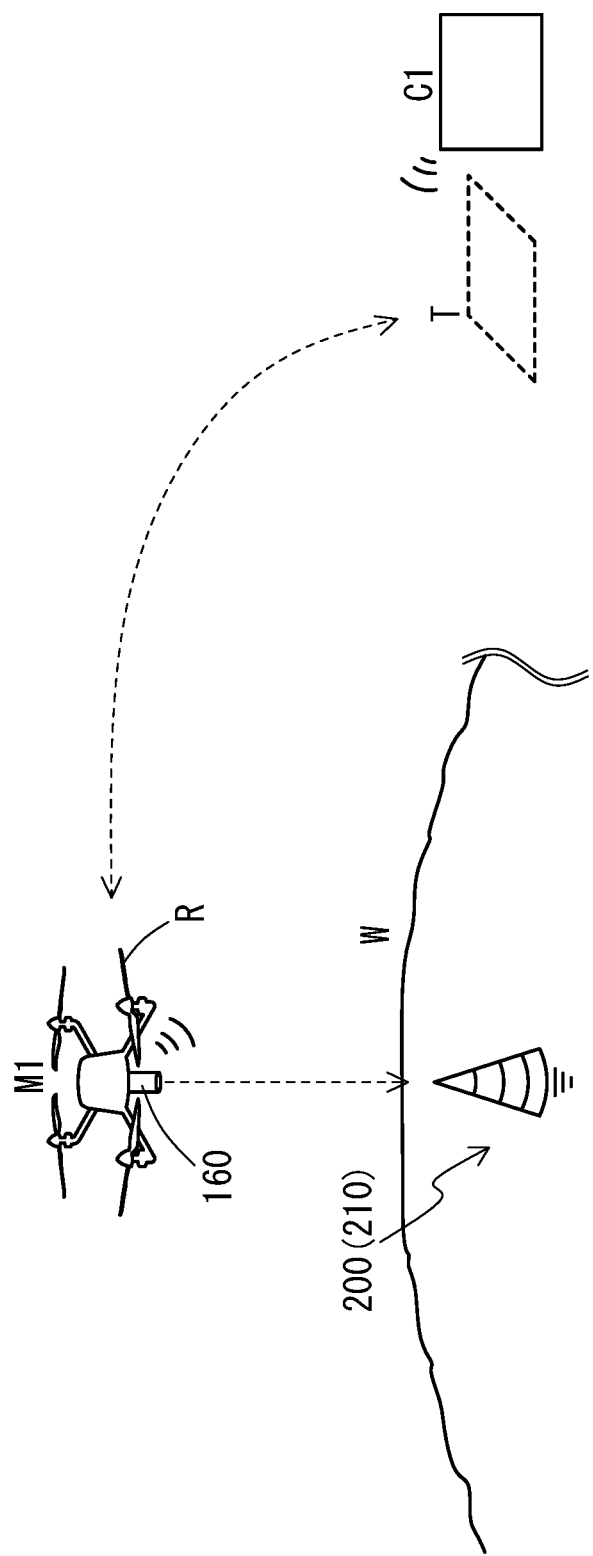
FIG. 1 is a schematic diagram depicting an aspect in which a water level measurement system pertaining to a first embodiment measures the water level of a water reservoir facility.

FIG. 1 is a schematic diagram depicting an aspect in which a water level measurement system S1 pertaining to a first embodiment measures the water level of the water reservoir facility W. The water level measurement system S1 is comprised mainly of a water level gauge 200 installed in the water reservoir facility W and a multicopter M1 (an unmanned aerial vehicle equipped with a plurality of rotary wings) which captures images of the water level gauge 200 from above with a camera 160 (image capturing means). An external surface of the water level gauge 200 corresponds to a scale part 210 marked with a scale indicating a water level and the scale part 210 is made to be a conic surface whose outside diameter decreases in an upward direction from a water surface.

In the water level measurement system S1, since the scale part 210 of the water level gauge 200 extends upward at an angle from the water surface, it is possible to catch sight of the scale part 210 even from vertically above. Thereby, it is possible to read a water level indicated by the scale part 210 even from an image captured through the use of the multicopter M1 from right above the water level gauge 200 in a direction directly beneath the multicopter. Since the water level gauge 200 is optimized for image capturing from above, in measuring a water level using the water level measurement system S1, it is not necessary for a worker to consider a way of image capturing suitable for conditions of environment of a water area where measurement is to be performed, and there is no need to use sophisticated skills for piloting the multicopter M1.

[Water Level Gauge Configuration]

FIG. 2 is a set of schematic diagrams depicting the structure of the water level gauge 200 and other adoptable forms of a water level gauge in the present invention. As the water level gauge 200 in the present embodiment, a conic shape one which is depicted in FIG. 2(b) is used. The form of a water level gauge is not limited to such a conic shape, but other shapes can be adopted, provided that the gauge is provided with a scale part extending upward at a predetermined angle of inclination from a water surface. For example, in FIG. 2(a), there is depicted a water level gauge 200b including a support post 220b installed to root in the bottom of water and erected vertically and a scale part 210b installed slantwise from the upper end of the support post 220b toward the bottom of water. Also, in FIG. 2(c), there is depicted a water level gauge 200c including a support post 220c installed to root in the bottom of water and erected vertically and a scale part 220c comprised of plural wires, one ends of which are joined at the upper end of the support post 220c and the other ends of which are fixed onto the bottom of water, so that the wires stretch at the same angle of inclination from the upper end. From among these gauges, one having a suitable form can be selected appropriately depending on the largeness and depth of a water area where measurement is to be performed, ambient brightness at image capturing, the performance of a camera to capture images of the water level gauge, a distance from the camera to a subject and angle for image capturing, the camera with/without an attitude stabilizer (a so-called gimbal), and other conditions.

Figure 2D:
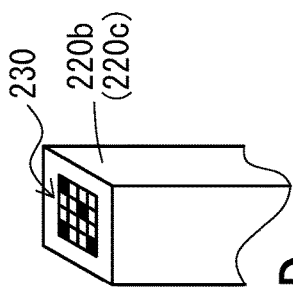
FIG. 2 is a set of schematic diagrams depicting the structure of a water level gauge and other forms applicable to a water level gauge in the present invention.
Figure 2E:
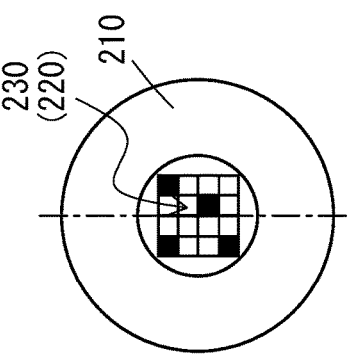
Figure 2B:
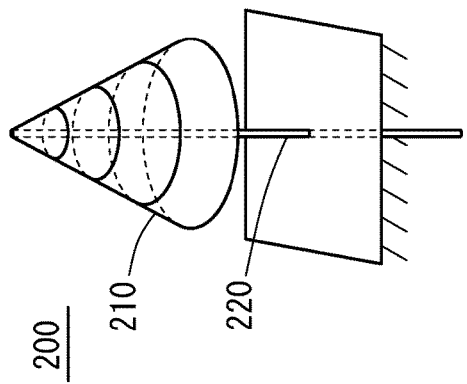
Figure 2C:
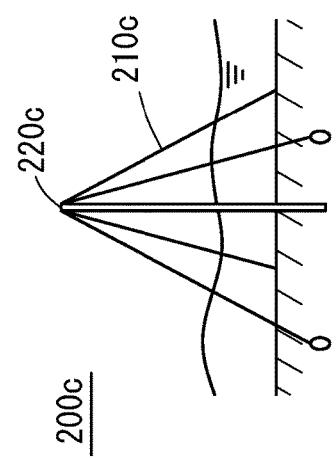

In addition, in an upper end part of the water level gauge 200 in the present embodiment, a two-dimensional information code 230 is displayed in a position that is visible from above, as depicted in FIG. 2(e). The information code 230 contains individual identification information of the water level gauge 200 and can uniquely identify the individual of the water level gauge 200 by decoding it with a decoder (DEC) (decoding means) to be described later. Now, the information code in the present embodiment is not limited to a two-dimensional display form; for example, a one-dimensional code such as, e.g., a barcode can also be adopted. Now, when the water level gauge 200b or 200c is used, it is expedient to place the information code 230 on the upper end face of its support post 220b or 220c, as depicted in FIG. 2(d). In the present embodiment, on the water level gauge 200, the information code 230 is displayed that represents its individual identification information; thereby, it is possible to exactly identify the individual of the water level gauge 200 and its water area even in an environment where multiple water level gauges 200 are installed within a relatively small coverage such as, e.g., in terraced paddy fields and small agricultural canals.

Figure 2A:
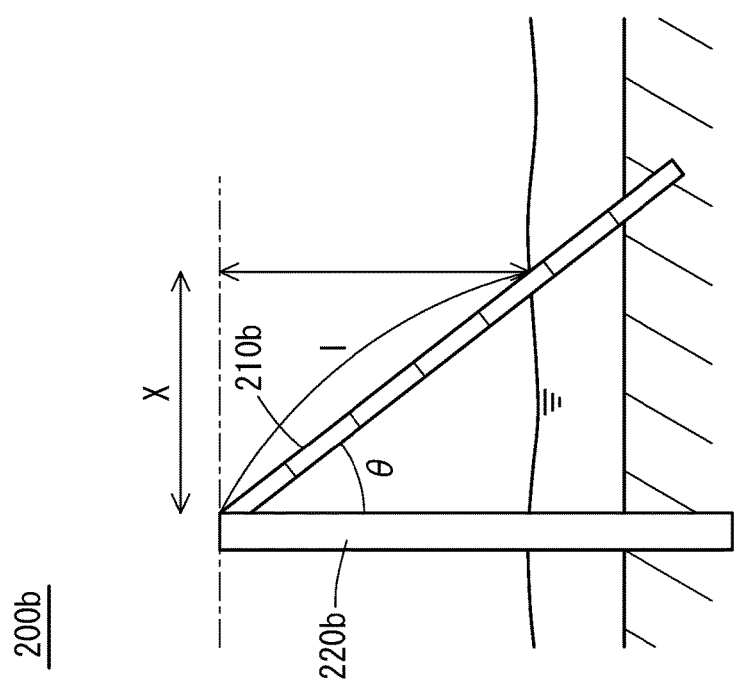

For the water level gauge 200 in the present embodiment, since its scale part 210 is marked with a scale, a water level can be read with reference to the scale; however, the scale of the scale part is not a requisite component. For example, as depicted in FIG. 2(a), given that h denotes the length of a part of the entire length of the support post 220b above the water surface, θ denotes the angle of inclination of the scale part 210b, and x denotes the horizontal length of the scale part 210b measurable from vertically above, h can be determined by x/tan θ. If the entire length of the support post 220b is known beforehand, it is also possible to determine a water level in this way.

An alternative configuration may be such that the surface color of the scale part 210 is made to change such that a part above the water surface has one color and a part under the water surface has another color. By making each part distinguishable by color, it is possible to visually perceive the water surface position indicated by the scale part 210 even in a water area where, e.g., water transparency is extremely high and the water surface is still. Especially, in the case of automating reading a water level from a captured image of the scale part 210, it would become possible to determine the water surface position without carrying out complicated image analysis as in PTL1 mentioned above. As a way of color changing for each part, it is conceivable, for example, to apply a paint that changes to a different color while it is wet with water or a paint whose color changes with change in temperature to the surface of the scale part 210. As a paint whose color changes by wetting with water, it is conceivable to use a paint including a substance (e.g., cobalt chloride) as a pigment that discolors by absorption of moisture, for example, as disclosed in JP 2007-037814 A. Alternatively, a structure or material that looks darker when absorbing moisture, thereby suppressing diffuse reflection of color, may be used. As a paint whose color changes depending on the surface temperature of the scale part 210, it is conceivable to use a reversible thermosensitive material, for example, as disclosed in JP S63-089757 A.

[Multicopter Configuration]

Figure 3:
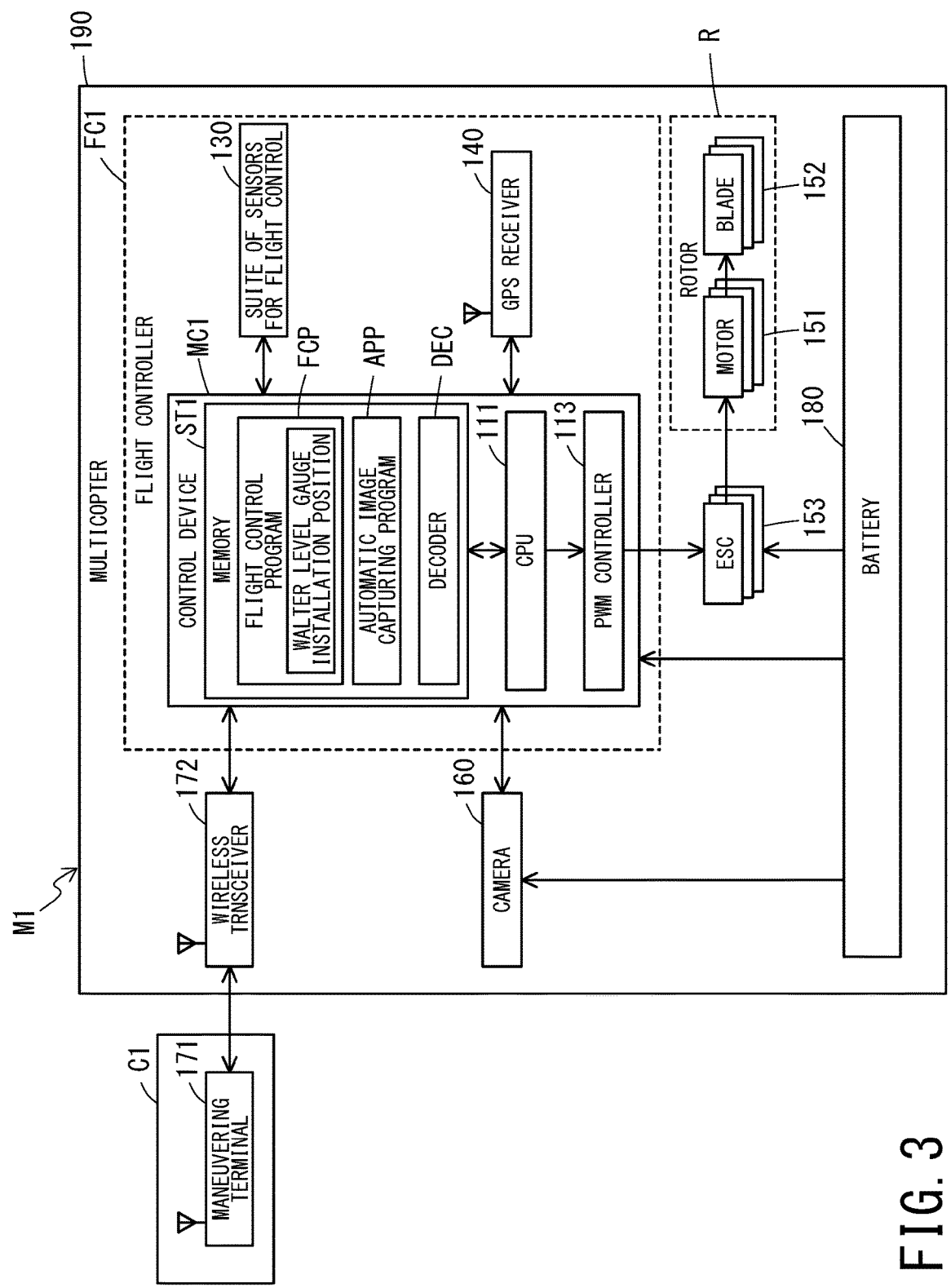
FIG. 3 is a block diagram depicting a functional configuration of a multicopter pertaining to the first embodiment.

FIG. 3 is a block diagram depicting a functional configuration of the multicopter M1 pertaining to the present embodiment. The multicopter M1 is comprised of a flight controller FC1 (a control unit), a plurality of rotors R (rotary wings), an ESC 153 (Electric Speed Controller) disposed for each rotor R, a wireless transceiver 172 for wireless communication with a manipulator's maneuvering terminal 171 (a command unit C1), and a battery 180 which is a power supply source, all of which are installed in position in or on a housing 190.

Each rotor R is comprised of a motor 151 which is a DC motor and a blade 152 installed to its output shaft. The ESC 153 is connected to the motor 151 of the rotor R and is a device which rotates the motor 151 at a speed commanded from the flight controller FC1. Now, the multicopter M1 in the present embodiment is a quadcopter equipped with four rotors R; however, the number of rotors R is not limited to four, and can be varied, as appropriate, from a helicopter with two rotors R to an octocopter with eight rotors R, further covering a multicopter equipped with more rotors, depending on required flight stability and permitted cost.

The flight controller FC1 includes a control device MC1 which is a microcontroller. The control device MC1 includes a CPU 111 which is a central processing unit, a memory ST1 which is a storage device such as ROM and RAM, and a PWM controller 113 which controls the rotating speed and rotational rate of each motor 151 via the ESC 153.

The flight controller FC1 further includes a suite of sensors 131 for flight control and a GPS receiver 140 (which may hereinafter be referred to as "sensors and other equipment" (flying position measuring means)) and they are connected to the control device MC1. The suite of sensors 130 for flight control of the multicopter M1 in the present embodiment includes an acceleration sensor, an angular velocity sensor, an atmospheric pressure sensor (altitude sensor), and a geomagnetic sensor (direction sensor). Through these sensors and other equipment, the control device MC1 is adapted to be able to acquire the multicopter's positional information including latitude/longitude, altitude, and a heading azimuth during flight, in addition to a tilt and turn of the airframe. Now, although the multicopter M1 in the present embodiment is assumed to acquire its flight altitude through an atmospheric pressure sensor, it is also possible to acquire the altitude by orienting a distance measurement sensor using any of various methods such as, e.g., infrared rays, ultrasonic waves, or laser toward the surface of ground or water, besides the atmospheric pressure sensor.

In the memory ST1 of the control device MC1, a flight control program FCP is stored in which a flight control algorithm is programmed to control attitude and basic flying operations during flight of the multicopter M1. According to a command by the manipulator (the maneuvering terminal 171), the flight control program FCP causes the multicopter M1 to fly, while adjusting the rotating speed and rotational rate of each rotor R and compensating the airframe attitude and positional misalignment based on the current position acquired from the sensors and other equipment. Piloting the multicopter M1 may be performed manually by the manipulator, using the maneuvering terminal 171. Alternatively, with parameters such as latitude/longitude, altitude, and a flight route which should be preregistered into the flight control program FCP, the program may cause the multicopter to fly autonomously to a destination (such autonomous flight will hereinafter be referred to as "autopilot").

In the memory ST1, the installation position of the water level gauge 200 is also stored. More specifically, the latitude and longitude of the water level gauge 200 is stored in the memory ST1 as a destination to fly to by an autopilot function. Therefore, the multicopter M1 is able to fly automatically by autopilot to the installation position of the water level gauge 200 stored in the memory ST1 and stay in the air vertically above that position. This dispenses with a worker's task of piloting the multicopter M1 manually and working efficiency is enhanced.

In the memory ST1, additionally, the following are registered: an automatic image capturing program APP which captures images of the water level gauge 200 (its scale part 210) automatically, triggered by an event that the multicopter M1 starts to hover vertically above the water level gauge 200; and a decoder DEC which reads the information code 230 of the water level gauge 200 from an image captured by the automatic image capturing program APP.

[Water Level Measurement Method]

Descriptions are provided below about a water level measurement method for the water reservoir facility W using the water level measurement system S1. As described above, first, the latitude and longitude of the water level gauge 200 are registered in advance into the memory ST1 as a destination to fly to by the autopilot function. When measuring a water level of the water reservoir facility W, a worker starts up the autopilot function of the multicopter M1 using the maneuvering terminal 171. Thereby, the multicopter M1 will fly automatically from a departure and arrival site T toward the installation position of the water level gauge 200 (an outward flying step). Then, when the multicopter M1 arrives at the installation position of the water level gauge 200 and starts to hover there, the automatic image capturing program APP captures images of the scale part 210 of the water level gauge 200 with the camera 160 oriented directly beneath the multicopter (an image capturing step). Here, using the decoder DEC, the multicopter M1 identifies the information code 230 from a captured image of the scale part 210 (and the water level gauge 200) and decodes individual identification information of the water level gauge 200. Now, capturing an image of the information code 230 may be performed separately from capturing an image of the scale part 210, and individual identification information decoded from the information code 230 may be embedded in the image of the scale part 210 additionally. Upon finishing the image capturing, the multicopter M1 automatically goes back to the departure and arrival site T by the autopilot function (a homeward flying step). The worker checks the images captured by the multicopter M1 that returned to the departure and arrival site T and visually reads the water level of the water reservoir facility W.

In the above image capturing step, the multicopter M1 may separately be provided with a function to make fine adjustment of its hovering position so that the information code 230 will be positioned substantially in the center of an image captured. If the information code 230 is not detected from a captured image of the foreseen installation position of the water level gauge 200, the multicopter may also separately be provided with a function to make a circle overhead spirally, centering around that position and search for an actual position of the water level gauge 200. Alternatively, the multicopter may separately be provided with a function to capture an image in a wider shooting range than normal from above the foreseen installation position of the water level gauge 200.

In the water level measurement method using the water level measurement system S1 of the present embodiment, the multicopter M1 automatically moves to the installation position of the water level gauge 200 by the autopilot function and automatically captures an image of the scale part 210; therefore, it is possible to check the water level of the water reservoir facility W without requiring the worker to go to the site. In addition, upon finishing the image capturing, the multicopter M1 returns to the departure and arrival site T; therefore, it is possible to perform maintenance of the airframe of the multicopter M1 and the camera 160 without requiring the worker to go to the site.

Now, the multicopter M1 in the present embodiment moves to the installation position of the water level gauge 200 by autopilot, and capturing images of the scale part 210 is also automated by the automatic image capturing program APP; however, these operations do not necessarily have to be carried out automatically. It is also possible to manually pilot the multicopter M1 and capture an image of the scale part 210, for instance, in cases as follows: the installation position of the water level gauge 200 lies within a radio coverage area of the maneuvering terminal 171 and a positional relation between the multicopter M1 and the water level gauge 200 can visually be perceived exactly; or, with a FPV (First-Person View) system installed separately, the position of the multicopter M1 relative to the position of the water level gauge 200 can be adjusted indirectly from an image captured by the multicopter M1.

Second Embodiment

Figure 4:
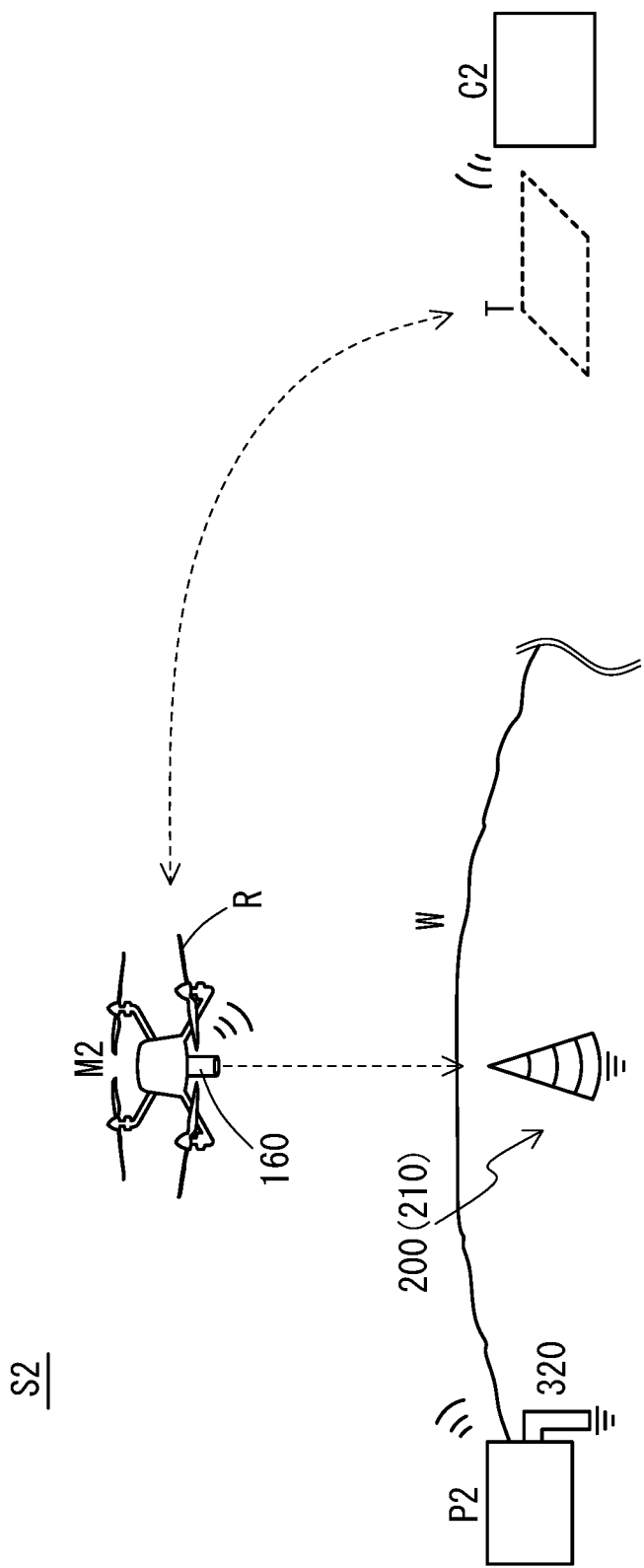
FIG. 4 is a schematic diagram depicting an aspect in which adjustment is made of the water level of a water reservoir facility by a water level control system pertaining to a second embodiment.
Figure 5:
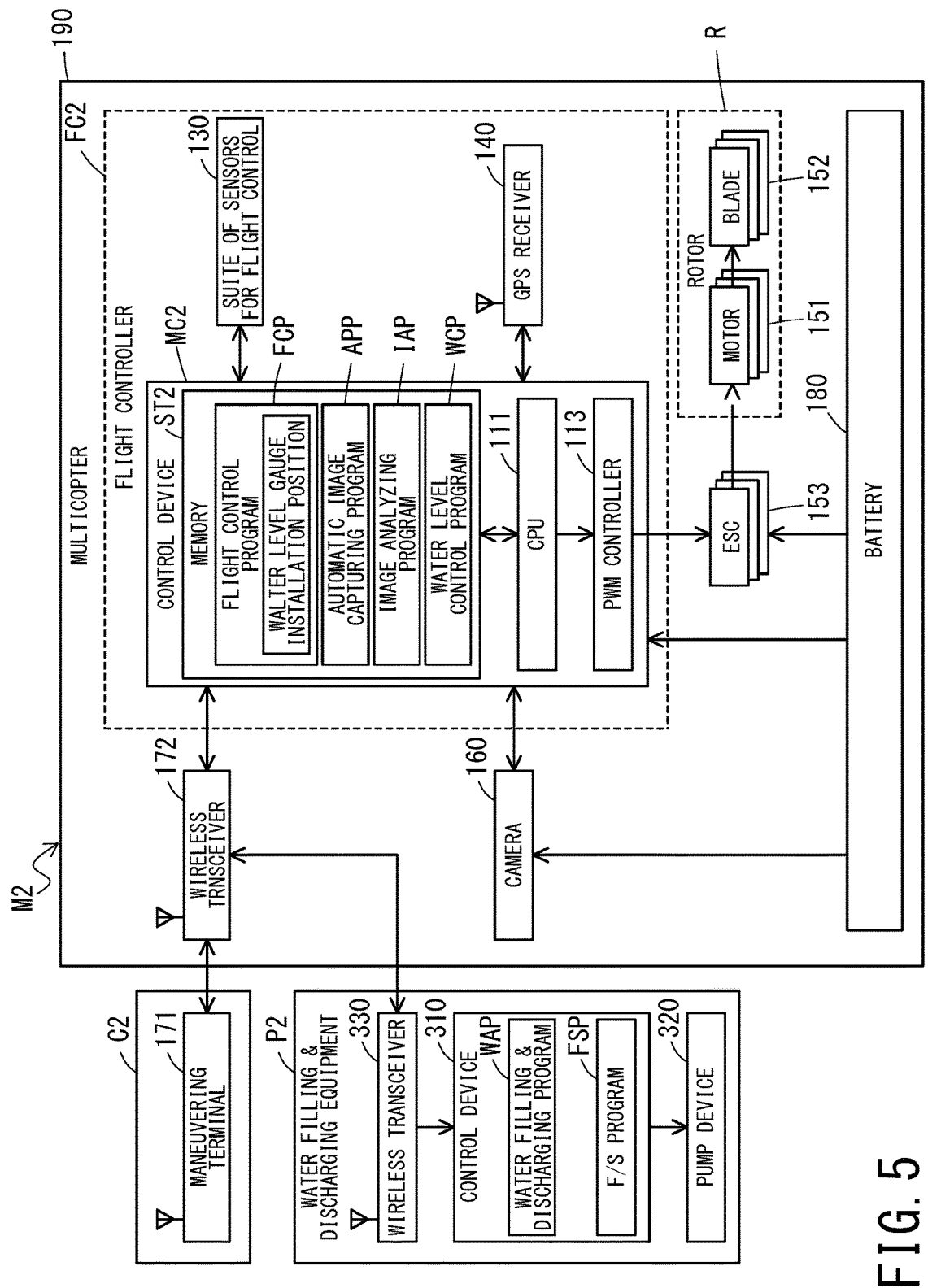
FIG. 5 is a block diagram depicting a functional configuration of the water level control system pertaining to the second embodiment.

A second embodiment of the present invention is described below with the aid of the drawings. FIG. 4 is a schematic diagram depicting an aspect in which adjustment is made of the water level of the water reservoir facility W by a water level control system S2 pertaining to the second embodiment. FIG. 5 is a block diagram depicting a functional configuration of the water level control system S2 pertaining to the second embodiment. Now, in the following description, a component having the same function as in the foregoing embodiment is assigned the same reference designator as in the foregoing embodiment and its detailed description is omitted. Also, a component having basic functions in common with the corresponding one in the foregoing embodiment is assigned the reference designator, with only a suffixed number changed, of the corresponding one in the foregoing embodiment, and a description about the basic functions is omitted.

[Overall Configuration]

The water level control system S2 includes water filling and discharging equipment P2 (water level adjustment equipment) which adjusts the amount of water in the water reservoir facility W using a pump device 320 in addition to the principal configuration of the first embodiment.

[Water Level Gauge Configuration]

The water level gauge 200 in the present embodiment has the same configuration as in the first embodiment.

[Multicopter Configuration]

A multicopter M2 in the water level control system S2 includes an image analyzing program IAP (a water level determining unit) which analyzes an image of the scale part 210 captured by the camera 160 and automatically determines a water level when the image was captured and a water level control program WCP (water level control means) which remotely operates the water filling and discharging equipment P2 through wireless communication, in addition to the functions in the first embodiment. For determining a water level by the image analyzing program IAP, publicly known image recognition technology such as PTL1 mentioned above can be used.

The water level measurement method for the water reservoir facility W using the water level measurement system S1 of the first embodiment involves a procedure in which the worker visually checks images of the scale part 210 captured by the multicopter M1 and reads a water level. Hence, the worker has to look through all the captured images. In the water level control system S2 according to the present embodiment, the multicopter M2 includes the image analyzing program IAP, so that a task to check images visually is dispensed with.

The multicopter M2 in the water level control system S2 also includes the water level control program WCP which remotely operates the water filling and discharging equipment P2, in addition to the image analyzing program IAP. Thereby, it is possible for the multicopter M2 to perform measuring a water level of the water reservoir facility W and adjusting the water level successively or at the same time, as needed.

Now, the multicopter M2 in the present embodiment may be provided with the decoder DEC in the first embodiment as well as a function of finely adjusting the image capturing position employing the decoder DEC and a function of searching for a water level gauge.

[Configuration of Water Filling and Discharging Equipment]

The water filling and discharging equipment P2 is equipment which adjusts the amount of water in the water reservoir facility W by filling and discharging water into/from the water reservoir facility W. The water filling and discharging equipment P2 includes the pump device 320 and carries out filling and discharging water into/from the water reservoir facility W using the pump device 320. The operation of the pump device 320 is determined by a water filling and discharging program WAP which the water filling and discharging equipment P2 includes. The water filling and discharging program WAP is registered in a control device 310 which the water filling and discharging equipment P2 includes and its execution is managed by the control device 310. The water filling and discharging equipment P2 further includes a wireless transceiver 330 which receives a control signal from the water level control program WCP in the multicopter M2. The control device 310 of the water filling and discharging equipment P2 executes the water filling and discharging program WAP and actuates the pump device 320, based on a control signal from the water level control program WCP.

Also, an F/S program FSP (fail-safe means) is further registered in the control device 310 of the water filling and discharging equipment P2. The F/S program FSP automatically stops water filling/discharging into/from the water reservoir facility W and keeps the water level as it is when a signal from the water level control program WCP is continuously absent for a predetermined period of time after the start of a remote operation of the water filling and discharging equipment P2 by the water level control program WCP and before receiving a signal indicating termination of the operation.

Since the water filling and discharging equipment P2 includes the F/S program FSP, even when any fault has occurred in the multicopter M2 during an operation of the water filling and discharging equipment P2, it is possible to prevent subsequent damage from spreading. Concrete action that the F/S program FSP takes is not limited to stop of the water filling and discharging in the present embodiment. Depending on the character of the water area in question, action for safety may be, for example, complete drainage of water by discharging water, or conversely, water filling up to a given water level.

[Water Level Control Method]

Descriptions are provided below about a water level control method for the water reservoir facility W using the water level control system S2. As described above, first, the latitude and longitude of the water level gauge 200 are registered in advance into the memory ST2 as a destination to fly to by the autopilot function. When carrying out measurement and control of a water level of the water reservoir facility W, a worker starts up the autopilot function of the multicopter M2 using the maneuvering terminal 171. Thereby, the multicopter M2 will fly automatically from the departure and arrival site T toward the installation position of the water level gauge 200 (the outward flying step). Then, when the multicopter M2 arrives at the installation position of the water level gauge 200 and starts to hover there, the automatic image capturing program APP captures images of the scale part 210 of the water level gauge 200 with the camera 160 oriented directly beneath the multicopter (the image capturing step). Subsequently, the multicopter M2 reads a water level of the water reservoir facility W from the captured images of the scale part 210 with the aid of the image analyzing program IAP. Here, if there is no problem with the water level, the multicopter M2 automatically goes back to the departure and arrival site T by the autopilot function (the homeward flying step). Otherwise, when the water level of the water reservoir facility W is not a proper value, the multicopter M2, with the aid of the water level control program WCP, operates the water filling and discharging equipment P2 and performs water filling/discharging into/from the water reservoir facility W (a water level adjustment step). At this time, the multicopter M2 repeats water level measurement of the water reservoir facility W periodically until the amount of water in the water reservoir facility W reaches the proper value. Once the amount of water in the water reservoir facility W reaches the proper value, the multicopter M2 transmits a signal indicating termination of the water filling/discharging operation to the water filling and discharging equipment P2 and automatically goes back to the departure and arrival site T by the autopilot function (the homeward flying step). Otherwise, for instance, in the event that the battery 180 of the multicopter M2 almost runs short and the multicopter M2 is controlled to go back forcibly during water filling/discharging, the F/S program FSP in the water filling and discharging equipment P2 is activated after a predetermined time and water filling/discharging is stopped.

In the water level control method using the water level control system S2 of the present embodiment, by providing the multicopter M2 with the image analyzing program IAP and the water level control program WCP, it is possible to keep the water level of the water reservoir facility W at a proper value without requiring the worker to make a decision halfway.

Moreover, since the multicopter M2 in the present embodiment captures images of the scale part 210, which is directly beneath it, from vertically above the scale part 210, even in an environment, for example, where water is opaque and a reflection of the scale part 210 is mirrored on a water surface, influence of the reflection on image recognition is reduced. Thereby, determining the water surface position from the captured images is facilitated and it is possible to determine the water surface position in a simpler procedure and at higher accuracy than PTL1 mentioned above. Now, in a situation where water transparency of the water reservoir facility W is extremely high and the water surface is still, it is expedient to use a paint that changes the surface color of the scale part 210 such that a part of the scale part 210 above the water surface has one color and a part under the water surface has another color or to capture images of the scale part 210 from slantwise above, not from vertically above. The scale part 210 in the present invention is installed in water at a predetermined angle of inclination and a part of the scale part 210 under the water surface looks refracted when observed from an oblique angle; therefore, with reference to a refraction position, a part below the refraction position can be determined as the part under the water surface. Alternatively, a conceivable way is to cause the multicopter M2 to fly relatively low (at about 3 to 4 m from the water surface) and intentionally ripple the water surface by downwash.

Third Embodiment

Figure 6:
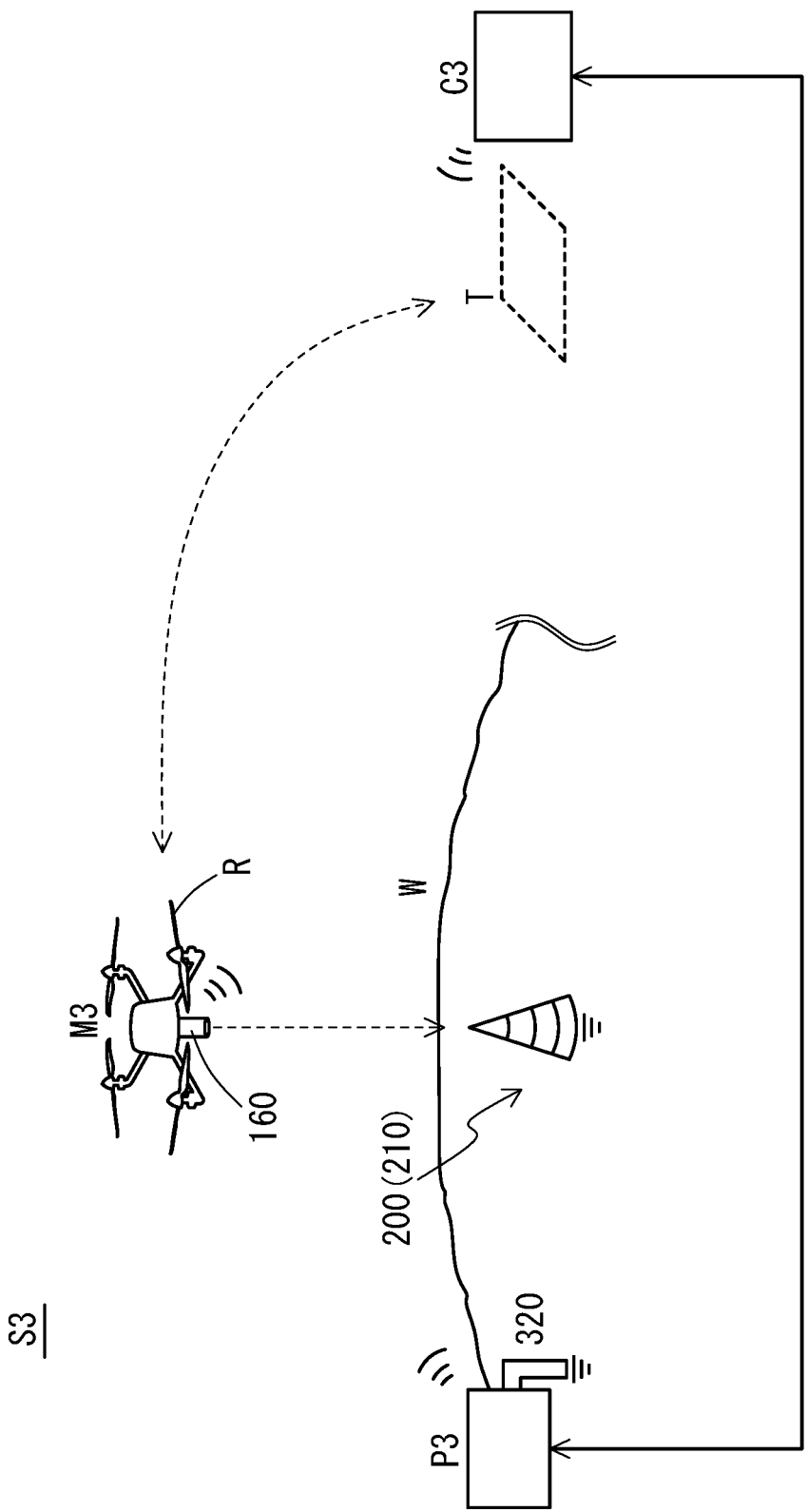
FIG. 6 is a schematic diagram depicting an aspect in which adjustment is made of the water level of a water reservoir facility by a water level control system pertaining to a third embodiment.
Figure 7:
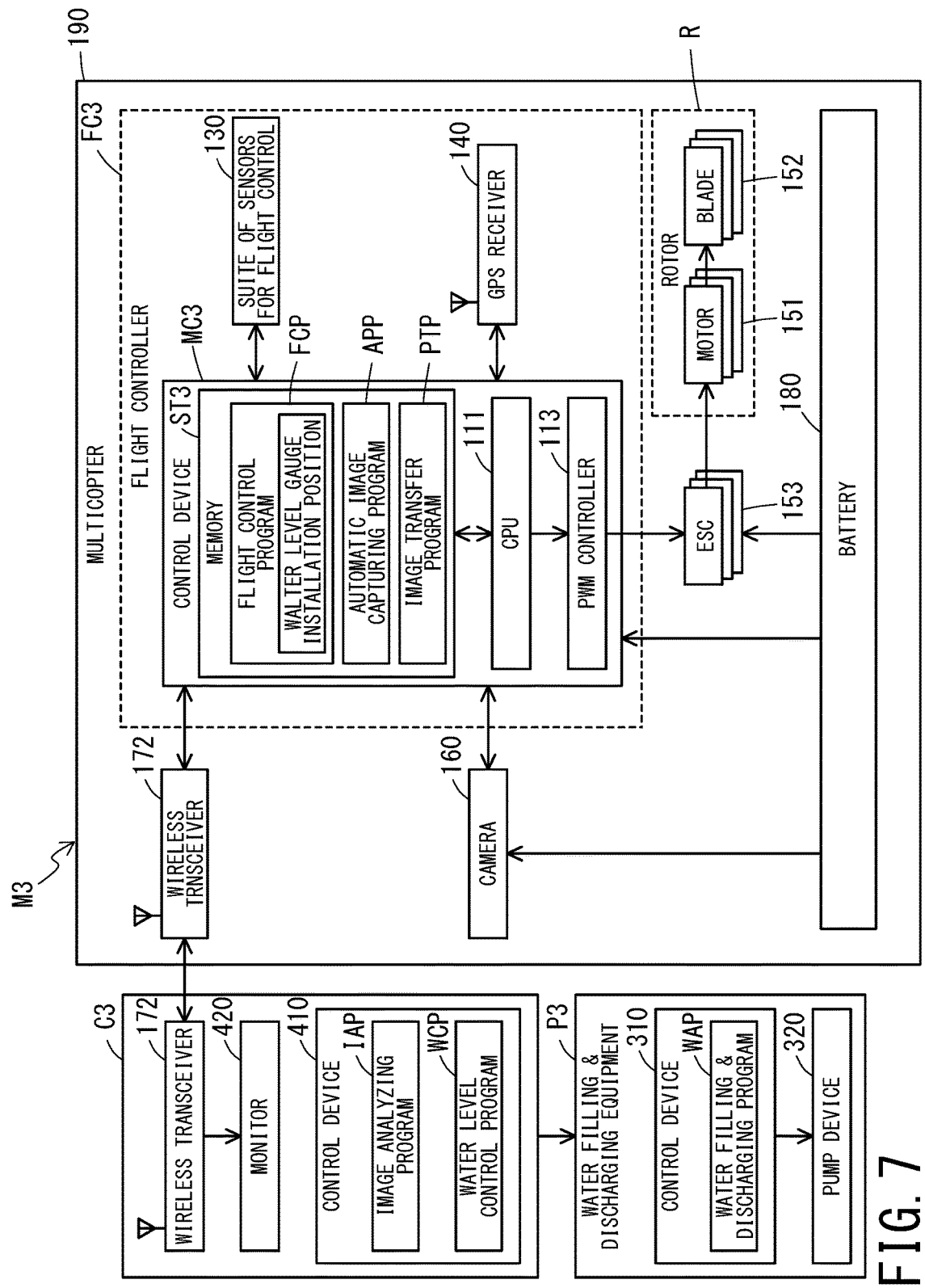
FIG. 7 is a block diagram depicting a functional configuration of the water level control system pertaining to the third embodiment.

A third embodiment of the present invention is described below with the aid of the drawings. FIG. 6 is a schematic diagram depicting an aspect in which adjustment is made of the water level of the water reservoir facility W by a water level control system S3 pertaining to the third embodiment. FIG. 7 is a block diagram depicting a functional configuration of the water level control system S3 pertaining to the third embodiment. Now, in the following description, a component having the same function as in the foregoing embodiments is assigned the same reference designator as in the foregoing embodiments and its detailed description is omitted. Also, a component having basic functions in common with the corresponding one in the foregoing embodiments is assigned the reference designator, with only a suffixed number changed, of the corresponding one in the foregoing embodiment, and a description about the basic functions is omitted.

[Overall Configuration]

A principal configuration of the water level control system S3 is generally the same as in the second embodiment. A command unit C3 in the water level control system S3 includes a wireless transceiver 172 capable of receiving image information of the scale part 210 captured by the multicopter M3 and a monitor 420 (display means) capable of displaying the image. In addition, although the image analyzing program IAP and the water level control program WCP are installed in the multicopter M2 in the second embodiment, these programs are installed in the command unit C3 in the water level control system S3. In addition, although the water filling and discharging equipment P2 is wirelessly connected with the multicopter M2 to allow wireless communication in the second embodiment, the water filling and discharging equipment P3 is wired connected with the command unit C3 in the water level control system S3. Additionally, the multicopter M3 is adapted to be able to communicate with the command unit C3 via a mobile communication network.

Since the command unit C3 and the multicopter M3 are connected via mobile communication networks which are laid nationwide, the command unit C3 can receive image information of the scale part 210 captured by the multicopter M3 substantially without being subjected to restrictions due to communication distance. Thereby, it is possible to measure a water level of a distant water area and adjust the water level from the command unit C3 without going to the site.

[Water Level Gauge Configuration]

The water level gauge 200 in the present embodiment has the same configuration as in the first embodiment.

[Multicopter Configuration]

The multicopter M3 in the present embodiment has generally the same configuration as in the first embodiment. The multicopter M3 in the present embodiment is separately provided with an image transfer program PTP which transfers a captured image of the scale part 210 to the command unit C3 every time the image is captured. Now, the multicopter M3 in the present embodiment also may be provided with the decoder DEC in the first embodiment as well as the function of finely adjusting the image capturing position employing the decoder DEC and the function of searching for a water level gauge.

[Configuration of Water Filling and Discharging Equipment]

The water filling and discharging equipment P3 in the present embodiment has generally the same configuration as in the second embodiment. The water filling and discharging equipment P3 in the present embodiment receives a control signal from the water level control program WCP, not from the multicopter M3 but from the command unit C3 through wired communication. Now, the water filling and discharging equipment P3 in the present embodiment does not include the F/S program FSP in the second embodiment; this is simply because communication with the water level control program WCP is stable as compared with the second embodiment, and the equipment P3 may include the F/S program.

[Water Level Control Method]

Descriptions are provided below about a water level control method for the water reservoir facility W using the water level control system S3. As described above, first, the latitude and longitude of the water level gauge 200 are registered in advance into the memory ST3 as a destination to fly to by the autopilot function. When carrying out measurement and control of a water level of the water reservoir facility W, a worker starts up the autopilot function of the multicopter M3 from the command unit C3. Thereby, the multicopter M3 will fly automatically from the departure and arrival site T toward the installation position of the water level gauge 200 (the outward flying step). Then, when the multicopter M3 arrives at the installation position of the water level gauge 200 and starts to hover there, the automatic image capturing program APP captures images of the scale part 210 of the water level gauge 200 with the camera 160 oriented directly beneath the multicopter (the image capturing step). The multicopter M3 transfers the captured image information of the scale part 210 to the command unit C3 every time the image has been captured. Upon receiving this image information, the command unit C3 automatically reads a water level of the water reservoir facility W from the image information with the aid of the image analyzing program IAP and notifies the multicopter M3 whether or not the water level is a proper value. Here, if there is no problem with the water level, the multicopter M3 automatically goes back to the departure and arrival site T by the autopilot function (the homeward flying step). Otherwise, if the water level of the water reservoir facility W is not the proper value, the command unit C3 notifies the worker of that event by notification means which is not shown. The notified worker executes the water level control program WCP in the command unit C3, operates the water filling and discharging equipment P3, and carries out water filling/discharging into/from the water reservoir facility W (the water level adjustment step). At this time, the multicopter M3 repeats water level measurement of the water reservoir facility W periodically until the water level of the water reservoir facility W reaches the proper value. On receiving a notification that the water level of the water reservoir facility W is the proper value, the multicopter M3 automatically goes back to the departure and arrival site T by the autopilot function (the homeward flying step).

In the present embodiment, the multicopter M3 and the command unit C3 are connected via a mobile communication network and this makes it possible to check the state of a distant water area in real time. In addition, the command unit C3 is configured to automatically read a water level from images captured by the multicopter M3 with the aid of the image analyzing program IAP, and notify a worker accordingly only when the worker's action is necessary; therefore, working efficiency of water level monitoring is enhanced.

Now, while the multicopter M3 is made to take off from and land on the departure and arrival site T located near the command unit C3 in the present embodiment, the departure and arrival site T may be placed near the water filling and discharging equipment P3 at a distant location.

While embodiments of the present invention have been described hereinbefore, the present invention is not limited to the foregoing embodiments and can be modified in various ways without departing from the gist of the present invention.

The invention claimed is:

1. A water level control system comprising:
   a water level measurement system that includes:
      a water level gauge including a scale part which is installed to extend upward at a predetermined angle of inclination from a water surface and the scale part is viewable from directly above, and
      an unmanned aerial vehicle including image capturing means configured to capture the scale part from above the scale part and a plurality of rotary wings;
   water level adjustment equipment capable of adjusting an amount of water in a water area in which the water level gauge is installed; and
   a command unit communicatively connected with the unmanned aerial vehicle and the water level adjustment equipment, wherein
   the unmanned aerial vehicle and the command unit are connected wirelessly, and
   the command unit includes display means for displaying information received from the unmanned aerial vehicle and water level control means for remotely operating the water level adjustment equipment.

2. The water level control system according to claim 1, wherein a surface color of the scale part changes reversibly by wetting with water or depending on surface temperature.

3. The water level control system according to claim 1, wherein the unmanned aerial vehicle further includes a control unit which controls autonomous flying with the plurality of rotary wings, a storage unit having an installation position of the scale part stored, and flying position measuring means for measuring a position where the vehicle is flying.

4. The water level control system according to claim 3, wherein the control unit is configured to fly the unmanned aerial vehicle autonomously flies to the scale part installation position stored in the storage unit and to capture images of the scale part using the image capturing means oriented directly beneath the vehicle while staying in the air vertically above the scale part.

5. The water level control system according to claim 4, wherein, on the water level gauge, a one-dimensional or two-dimensional information code representing individual identification information of the water level gauge is displayed in a position that is visible from above; and
   the unmanned aerial vehicle includes decoding means for reading the individual identification information from an image of the information code captured by the image capturing means.

6. The water level control system according to claim 3, further comprising a water level determining unit which analyzes an image of the scale part captured by the image capturing means of the unmanned aerial vehicle and determines a water level when the image is captured.

7. The water level control system according to claim 6, wherein the unmanned aerial vehicle includes the water level determining unit and water level control means for remotely operating the water level adjustment equipment through wireless communication.

8. The water level control system according to claim 7, wherein the water level adjustment equipment includes fail-safe means for automatically placing the equipment in a predefined operation state when a signal from the water level control means is absent for a predetermined period of time or longer after the start of a remote operation by the water level control means and before receiving a signal indicating termination of the operation.

9. A water level control method using the water level control system according to claim 7, comprising:
   an outward flying step in which the unmanned aerial vehicle autonomously flies from a departure and arrival site toward the scale part installation position stored in the storage unit;

an image capturing step in which the unmanned aerial vehicle captures images of the scale part through the image capturing means oriented directly beneath the vehicle while staying in the air vertically above the scale part;

a water level adjustment step in which, based on a result of the image capturing step, the water level control means remotely operates the water level adjustment equipment; and a homeward flying step in which the unmanned aerial vehicle autonomously flies and comes back to the departure and arrival site.

10. A water level measurement method using the water level measurement system according to claim 1, comprising:

an outward flying step which causes the unmanned aerial vehicle to fly from a departure and arrival site toward the water level gauge installation position;

an image capturing step which causes the unmanned aerial vehicle to capture images of the scale part through the image capturing means oriented directly beneath the vehicle while keeping the vehicle in the air vertically above the scale part; and a homeward flying step which causes the unmanned aerial vehicle to come back to the departure and arrival site.

11. A water level measurement system comprising:

a water level gauge including a scale part which is installed to extend upward at a predetermined angle of inclination from a water surface and the scale part is viewable from directly above; and an unmanned aerial vehicle including image capturing means configured to capture the scale part from above the scale part and a plurality of rotary wings, wherein a control unit configured to fly the unmanned aerial vehicle autonomously to the scale part installation position stored in a storage unit and to capture images of the scale part using the image capturing means oriented directly beneath the vehicle while staying in the air vertically above the scale part, on the water level gauge, a one-dimensional or two-dimensional information code representing individual identification information of the water level gauge is displayed in a position that is visible from above; and the unmanned aerial vehicle includes decoding means for reading the individual identification information from an image of the information code captured by the image capturing means.

\* \* \* \* \*